United States Patent
Wang et al.

(10) Patent No.: US 9,792,228 B2
(45) Date of Patent: Oct. 17, 2017

(54) ENHANCING LIFETIME OF NON-VOLATILE CACHE BY INJECTING RANDOM REPLACEMENT POLICY

(71) Applicant: Advanced Micro Devices, Inc., Sunnyvale, CA (US)

(72) Inventors: Zhe Wang, San Antonio, TX (US); Yuan Xie, State College, PA (US); Yi Xu, Beijing (CN); Junli Gu, Beijing (CN); Ting Cao, Beijing (CN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 92 days.

(21) Appl. No.: 14/229,404

(22) Filed: Mar. 28, 2014

(65) Prior Publication Data

US 2015/0100739 A1    Apr. 9, 2015

Related U.S. Application Data (63) Continuation of application No. PCT/CN2013/084877, filed on Oct. 9, 2013.

(51) Int. Cl.
  *G06F 12/127* (2016.01)
  *G06F 12/121* (2016.01)

(52) U.S. Cl.
  CPC .......... *G06F 12/127* (2013.01); *G06F 12/121* (2013.01); *G06F 2212/222* (2013.01)

(58) Field of Classification Search
  None
  See application file for complete search history.

(56) References Cited

U.S. PATENT DOCUMENTS

| | | | |
|---|---|---|---|
| 6,438,641 B1* | 8/2002 | Kanno | G06F 12/0882 711/202 |
| 2007/0208904 A1 | 9/2007 | Hsieh et al. | |
| 2012/0124318 A1* | 5/2012 | Bivens | G06F 11/3409 711/170 |
| 2014/0089559 A1* | 3/2014 | Cai | G06F 12/126 711/102 |

FOREIGN PATENT DOCUMENTS

| | | |
|---|---|---|
| CN | 101030166 A | 5/2007 |
| CN | 101620572 A | 6/2010 |
| CN | 103019624 A | 3/2013 |

OTHER PUBLICATIONS

Ghasemzadeh, H., et al., "Modified Pseudo LRU Replacement Algorithm," *Proceedings of the 13th Annual IEEE International Symposium and Workshop on Engineering of Computer Based Systems*, Institute of Electrical and Electronics Engineers, United States (2006).

(Continued)

*Primary Examiner* — Midys Rojas
(74) *Attorney, Agent, or Firm* — Volpe and Koenig, P.C.

(57) ABSTRACT

A method, a system and a computer-readable medium for writing to a non-volatile cache memory are provided. The method maintains a write count associated with a set of memory locations. The method then selects a cache replacement policy based on the value of the write count and selecting a block within the set for writing data using the selected cache replacement policy. The selected cache replacement policy can introduce a randomized selection.

18 Claims, 10 Drawing Sheets

(56) References Cited

OTHER PUBLICATIONS

Jaleel, A., et al., "High Performance Cache Replacement Using Re-Reference Interval Prediction (RRIP)," *ISCA '10*, Association for Computing Machinery, United States (2010).
Khan, S., et al., "Sampling Dead Block Prediction for Last-Level Caches," *Proceedings of the 43rd Annual IEEE/ACM International Symposium on Microarchitecture*, Institute of Electrical and Electronics Engineers, United States (2010).
Qureshi, M. K., et al., "Adaptive Insertion Policies for High Performance Caching," *ISCA '07*, Association for Computing Machinery, United States (2007).
Qureshi, M. K., et al., "Enhancing Lifetime and Security of PCM-Based Main Memory with Start-Gap Wear Leveling," *Micro '09*, Association for Computing Machinery, United States (2009).
Qureshi, M. K., et al., "Scalable High Performance Main Memory System Using Phase-Change Memory Technology," *ISCA '09*, Association for Computing Machinery, United States (2009).
Wang, J., et al., "i$^2$WAP: Improving Non-Volatile Cache Lifetime by Reducing Inter- and Intra-Set Write Variations," *HPCA 2013*, Institute of Electrical and Electronics Engineers, United States (2013).
International Search Report for International Application No. PCT/CN2013/084877, State Intellectual Property Office of The P.R. China, China, mailed on July 14, 2014.
Written Opinion of the International Searching Authority for International Application No. PCT/CN2013/084877, State Intellectual Property Office of The P.R.China, China, mailed on July 14, 2014.
English language Abstract of Chinese Patent Publication No. CN101620572A, European Patent Office, espacenet database—Worldwide.
English language Abstract of Chinese Patent Publication No. CN103019624A, European Patent Office, espacenet database—Worldwide.

* cited by examiner

ENHANCING LIFETIME OF NON-VOLATILE CACHE BY INJECTING RANDOM REPLACEMENT POLICY

BACKGROUND

Field

Embodiments relate generally to cache memory and in particular to replacement policies in non-volatile cache memory.

Background

A cache memory can be a type of memory that a processor can access faster than main memory. Cache memories can be used to improve performance by keeping frequently accessed data in the faster cache and avoiding the need to constantly fetch data from a slower main memory. When a processor needs to read data from main memory, it can first look in the cache to see if the data is present there.

Cache replacement policies decide what data to maintain and evict from a cache memory as a result of memory reads and writes. In general, cache replacement policies aim to maximize cache hits in order improve memory access speeds. However, this approach may be unsuitable for memory types different from those traditionally used as cache memories. In particular, this approach may decrease the lifetime of non-volatile memory.

Recent developments have raised the possibility of utilizing non-volatile memory as cache. Using non-volatile memory as cache may lead to lower power consumption and charge leakage, as well as a higher density cache. However, systems using cache memory should take into account that non-volatile memory wears out with usage, and that wear-leveling techniques can be used to maximize the lifetime of non-volatile memory. Wear-leveling techniques can attempt to spread the usage of non-volatile memory blocks evenly among all blocks.

BRIEF SUMMARY OF EMBODIMENTS

As a result, it would be desirable to provide cache replacement policies targeted towards non-volatile memory, which can produce improved access speeds while maximizing non-volatile memory lifetime.

Amongst other embodiments, a method, a system and a computer-readable medium for writing to a cache memory are provided. The method maintains a write count associated with a set of memory locations. The method then selects a cache replacement policy based on the value of the write count and selecting a block within the set for writing data using the selected cache replacement policy. The selected cache replacement policy can introduce a randomized selection.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the relevant art(s) to make and use the embodiments.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
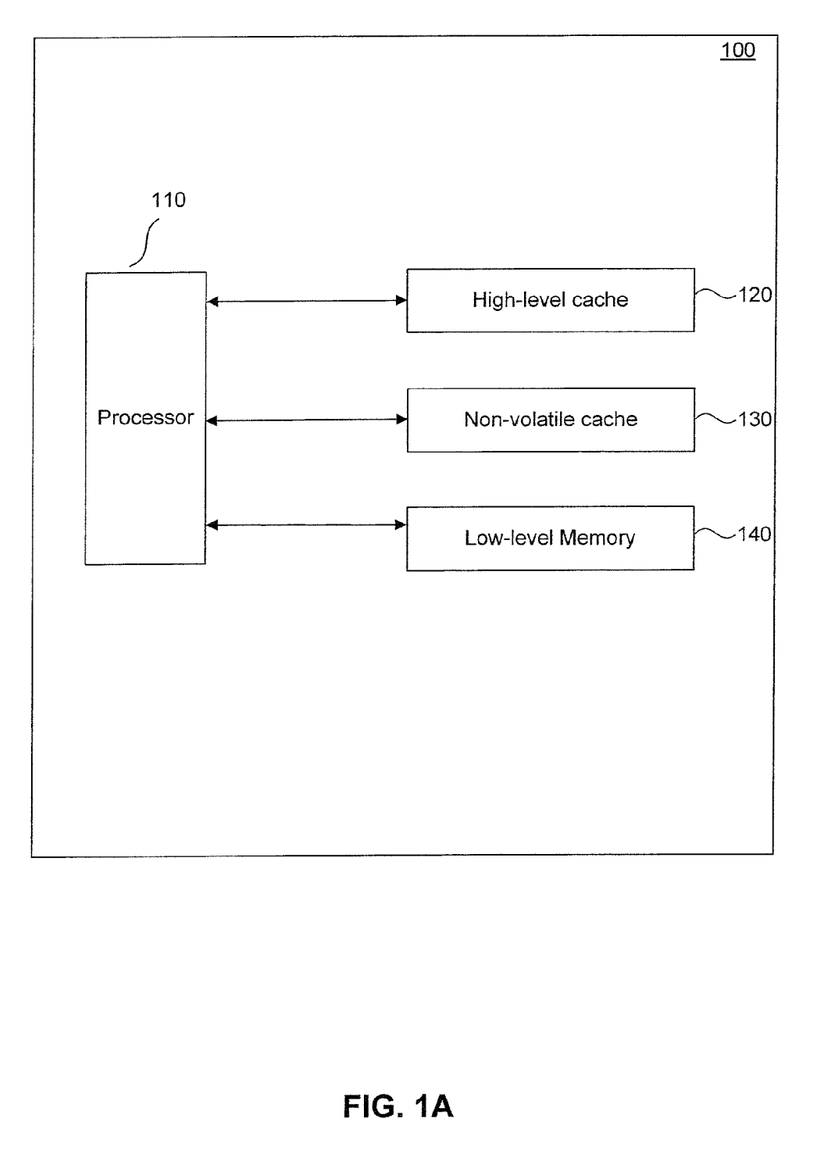
FIG. 1A is a block diagram of an illustrative computer operating environment, according to an embodiment.

FIG. 1A is a block diagram of an illustrative computer operating environment 100, according to an embodiment. In one example, operating environment 100 includes a processor 110, a high-level cache 120, a non-volatile cache 130 and a low-level main memory 140.

In one example, a memory is a piece of hardware which stores and loads data in response to electronic signals carrying instructions. In general, memory may be volatile and non-volatile memory. Examples of volatile memory include a random access memory (RAM). Volatile memory typically stores data as long as the electronic device receives power. Examples of non-volatile memory include read-only memory, flash memory, ferroelectric RAM (F-RAM), hard disks, floppy disks, magnetic tape, optical discs, etc. Non-volatile memory retains its memory state when the electronic device loses power or is turned off. In an embodiment, non-volatile memory 130 can be used as a cache memory. Cache memory is a memory that stores copies of data from recently accessed memory locations from main memory in order to allow faster access. In an embodiment, processor 110 reads data from and writes data to memories 120, 130 and 140 as part of program or application execution.

Processor 110 is connected to and can read and write data to and from the high-level cache 120, the non-volatile cache 130 and the low-level main memory 140. All or some of processor 110, high-level cache 120, non-volatile cache 130 and low-level memory 140 may form part of a single chip, or may form separate chips in any combination. In certain embodiment, high-level cache 120, non-volatile cache 130 and low-level memory 140 can read and write data from each other. In certain embodiments, high-level cache 120, non-volatile cache 130 and low-level memory 140 can communicate directly. In certain embodiments, high-level cache 120, non-volatile cache 130 and low-level memory 140 can communicate through a processor.

Processor 110 can be implemented in hardware, software, or any combination thereof. Processor 110 can execute a replacement policy in accordance with embodiments described herein. In an embodiment, processor 110 can be a memory controller circuit, and can be separate or integrated into another processor.

High-level cache 120 and non-volatile cache 130 can be cache memories. In an embodiment, non-volatile cache 130 serves as a middle cache between the high-level cache 120 and the low-level main memory 140.

Cache memory typically can be used to improve performance by keeping frequently accessed data in the faster cache and avoiding the need to constantly fetch data from a slower main memory. When a processor needs to read data from main memory, it first looks in the cache to see if the data is present there. If the data is present in the cache, also known as a "cache hit," the processor can quickly read the data from the cache. If the data is not found in the cache, also known as a "cache miss," the processor must fetch the data from main memory.

In an embodiment, a processor reads and writes memory data in blocks. In an embodiment, a block is of a fixed size. Blocks can be stored in cache memory along with a tag. The tag can be used to identify the main memory location to which the block corresponds to. The processor can look for memory blocks in the cache by using a tag matching index, which maps cache memory blocks to the corresponding location in the main memory.

Because the cache is generally smaller in size than the main memory, a processor will have to decide what data to maintain in the cache. When writing a new value to the cache, the processor must select where to place it and consequently what value will be evicted from the cache.

In certain embodiments, a cache can be written in two instances. One instance can be when the system needs to write to a main memory location. However, instead of writing the value to main memory, the processor can write it to a location in the cache and postpone the write to main memory for later. A request to write to the cache before main memory is known as a "writeback request." The processor can search the tag index to determine if the main memory location is present in the cache. If the main memory location that is to be written is already present in the cache (also known as a "write hit") the corresponding cache location can be overwritten with the new value. The cache block can then be marked as "dirty," meaning that the main memory location has not yet been updated with the new value. Before a dirty block is evicted from the cache memory, the value in the block must be written to the corresponding location in the main memory.

The processor can also need to write to the cache when the processor needs to read from a main memory location and there is a cache miss. The block can then be fetched from the main memory and placed in the cache, along with the tag which identifies the main memory location. This is known as a "replacement write." In order to place the block in the cache, the processor can select another block to be evicted from the cache and be replaced by the new block. The processor can employ a replacement policy to select the block to be replaced.

In general, cache replacement policies aim at improving performance by attempting to maintain the most accessed data in the cache, thus minimizing cache misses. However, using non-volatile memory as cache introduces additional considerations for a cache replacement policy. The cells of a non-volatile memory wear out over time as they are written. In order to extend the life of a non-volatile memory chip, a system should perform writes to cells on a roughly equal basis. A replacement policy for a non-volatile cache can be designed to use all cells on a roughly equal basis.

Figure 1B:
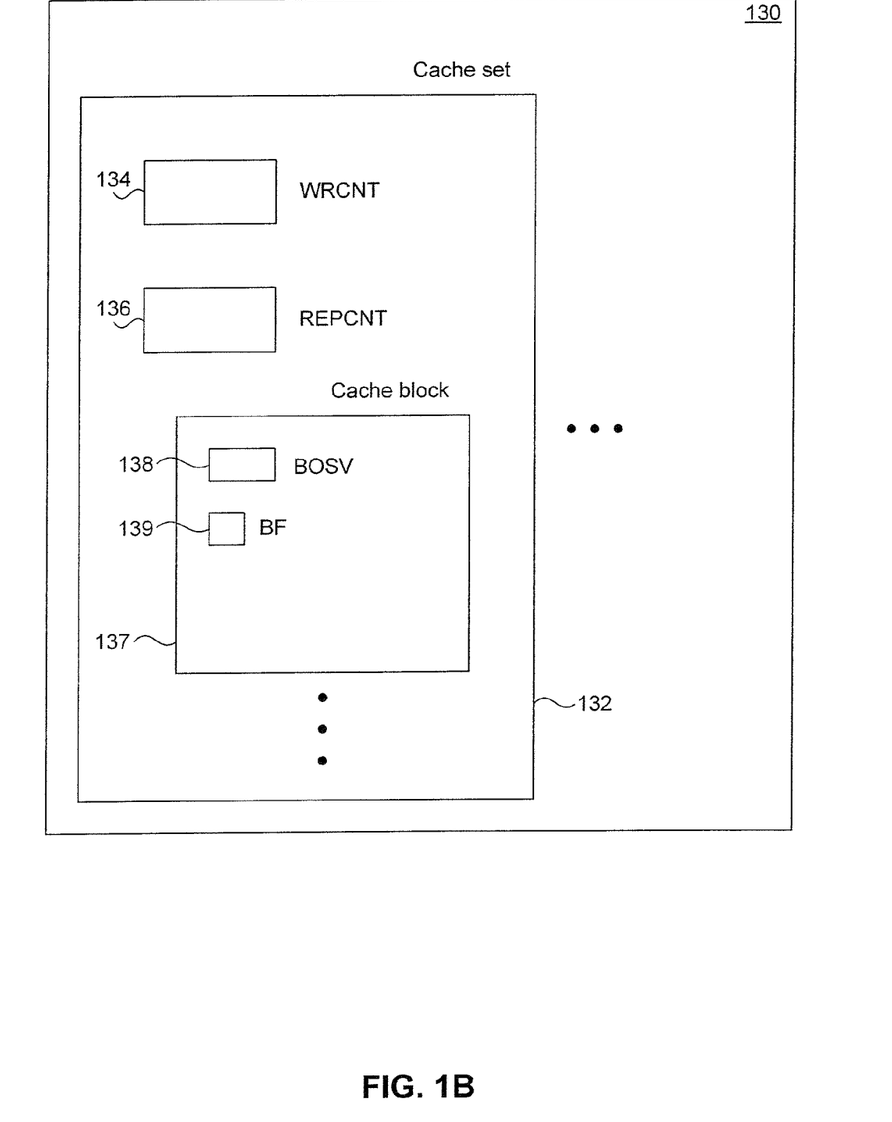
FIG. 1B shows a segmentation scheme for applying a replacement policy for a non-volatile cache memory 130, according to an embodiment.

FIG. 1B shows a segmentation scheme for applying a replacement policy for a non-volatile cache memory 130, according to an embodiment. The cache memory 130 can be segmented into one or more cache sets 132. Each cache set 132 can be divided into one or more cache blocks 137. Each cache set can be associated with a write counter (WRCNT) 134 and a replacement counter (REPCNT) 136. Each block can be associated with a bit flag (BF) 139 and a block offset shift value (BOSV) 138. WRCNT 134 and REPCNT 136 can be used to implement an intra-set replacement policy. BF 139 and BOSV 138 can be used to implement an intra-block replacement policy.

Intra-Set Write Variation—Randomized Intelligent Replacement Policy

In an embodiment, a scheme can incorporate random replacements into an intelligent cache replacement policy in order to randomize the writes to each cache block within a cache set. Randomizing the block selection reduces the intra-set write variation among multiple blocks in a set. In an embodiment, the scheme can select to use either an intelligent replacement policy or a random replacement policy depending on the write count to the block. Any intelligent cache replacement policy can be chosen, as those skilled in the relevant arts will understand. In an embodiment, the intelligent cache replacement policy may be Re-reference Interval Prediction (RRIP), Dynamic Insertion Policy (DIP), Sampler Dead Block, etc. In an embodiment, the intelligent replacement policy can be designed to maximize the cache hit rate.

Figure 2:
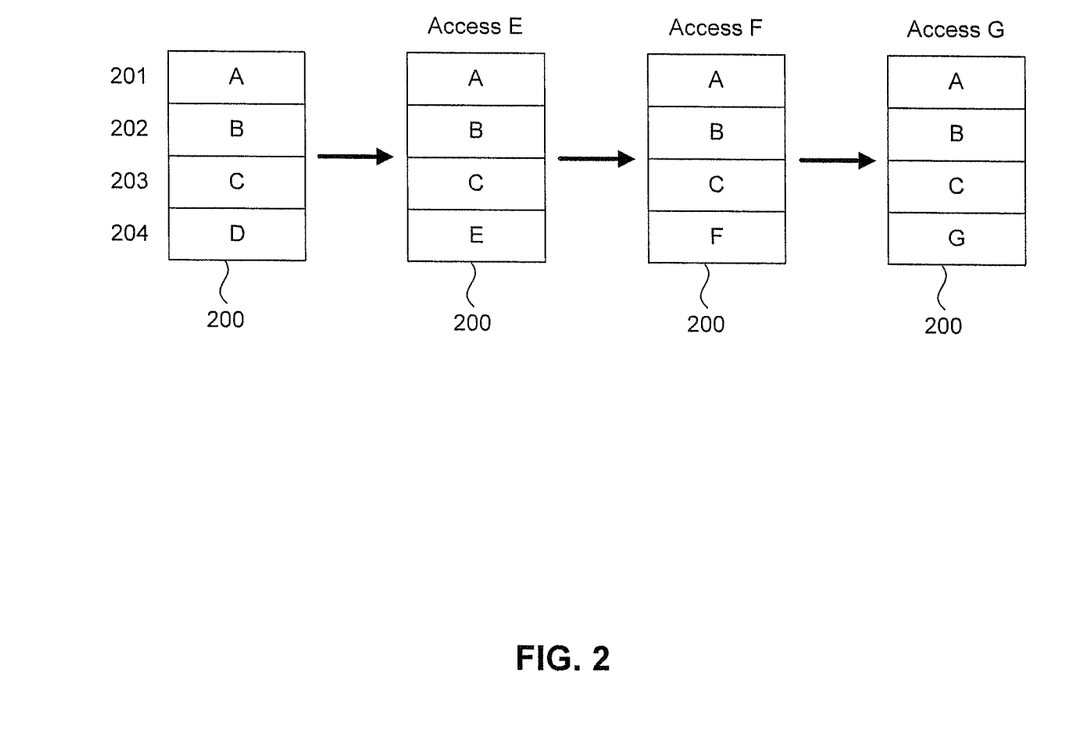
FIG. 2 illustrates the operation of an exemplary intelligent cache replacement policy on a cache set, according to an embodiment.

FIG. 2 illustrates the operation of an exemplary intelligent cache replacement policy on a cache set 200, in an embodiment. FIG. 2 depicts the exemplary contents of cache set 200 after subsequent writes using an intelligent cache replacement policy. Cache set 200 contains cache blocks 201, 202, 203 and 204.

In an embodiment, the intelligent cache replacement policy can operate in the following manner. Cache set 200 can initially store data A, B, C, D in blocks 201, 202, 203 and 204, respectively. Cache set 200 can receive a request to write data E, and the intelligent replacement policy can select cache block 204 to store data E. Cache set 200 can then receive a request to write data F, which replaces data E in cache block 204. Finally, cache set 200 can receive a request to write data G and, again, places data G in cache block 204, replacing data F. If this intelligent cache replacement policy was applied to a non-volatile cache memory, data block 204 may wear out faster than the other blocks, since it is written several times more.

Figure 3:
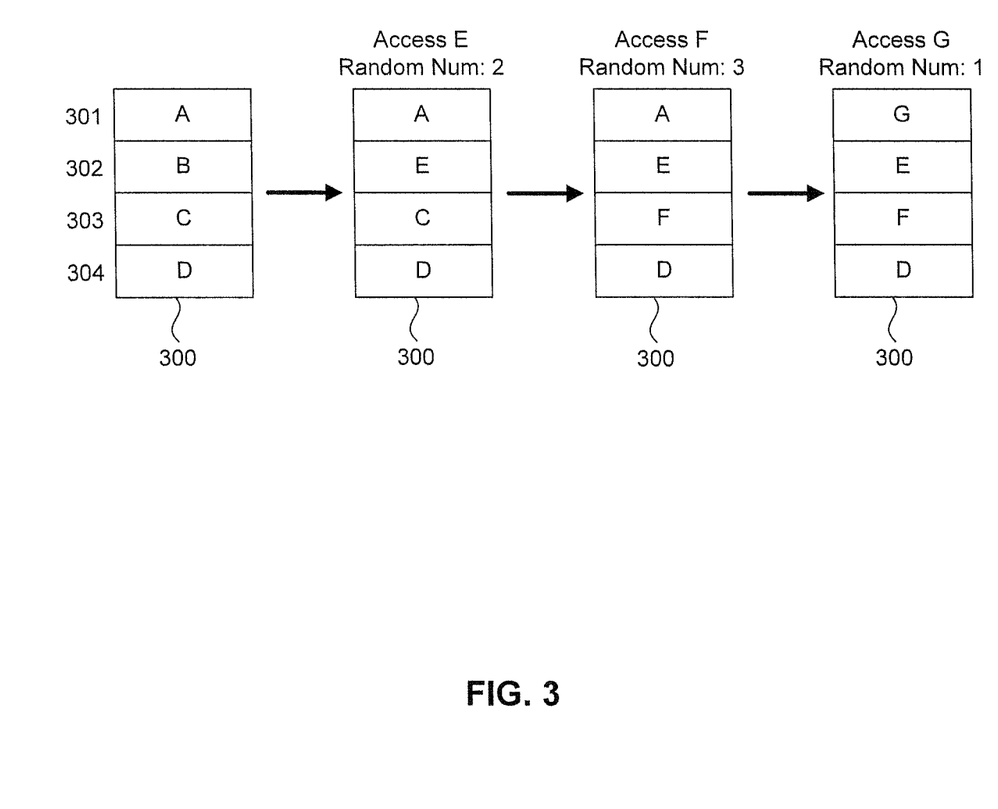
FIG. 3 depicts the operation of an exemplary random cache replacement policy on a cache set, according to an embodiment.

FIG. 3 depicts the operation of an exemplary random cache replacement policy on a cache set 300, according to an embodiment. FIG. 3 depicts the exemplary contents of cache set 300 after subsequent writes using a random cache replacement policy. Cache set 300 contains cache blocks 301, 302, 303 and 304.

In an embodiment, the random cache replacement policy may operate in the following manner. Cache set 300 initially stores data A, B, C, D in blocks 301, 302, 303 and 304, respectively. Cache set 300 receives a request to write data E, and the random replacement policy selects a random block to store data E. In this example, the random replacement policy randomly selects block 302, and replaces data B with data E. The cache set then receives a request to write data F, and the random replacement policy randomly selects block 203 to store data F. Finally, the cache set receives a request to write data G, and the random replacement policy randomly selects block 203 to store data G. In such an example, the randomized selection of blocks may cause the blocks to wear out more evenly.

Figure 4:
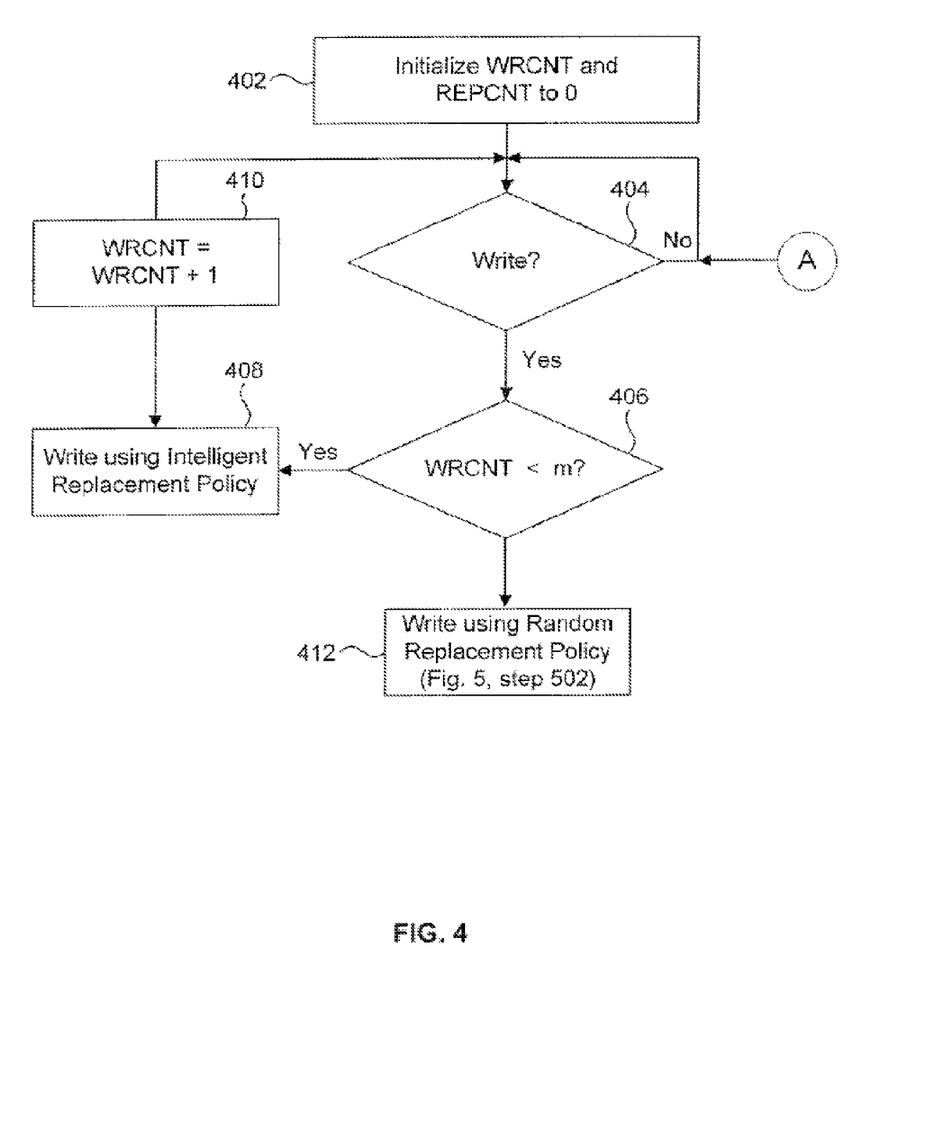
FIG. 4 depicts a flowchart describing the operation of a non-volatile cache replacement policy comprising injecting random replacement into an intelligent replacement policy, according to an embodiment.

FIG. 4 depicts a flowchart 400 describing the operation of a non-volatile cache replacement policy comprising injecting random replacement into an intelligent replacement policy, according to an embodiment. As can be appreciated, method 400 may not occur in the order shown or include all the operations shown.

As described with reference to FIG. 1B above, a WRCNT and REPCNT can be maintained for each cache set. At step 402, the WRCNT and REPCNT can be initialized to 0. At step 404, a write request can be received for the cache set. For each write to the cache set, the corresponding WRCNT can be incremented by one, as shown at step 410.

At step 406, the method determines if the WRCNT is less than a threshold m. If the WRCNT is less than m, the method can proceed to step 408 and use an intelligent replacement policy to select a block to write. Again, any intelligent cache replacement policy can be used in this step. By way of example, the intelligent cache replacement policy can be Re-reference Interval Prediction (RRIP), Dynamic Insertion Policy (DIP), Sampler Dead Block, etc. If the WRCNT is greater than or equal WRCNT, then the method, at step 412, can select to use a random replacement policy to randomly select a block to write. This random block selection policy is described in detail with reference to FIG. 5.

Figure 5:
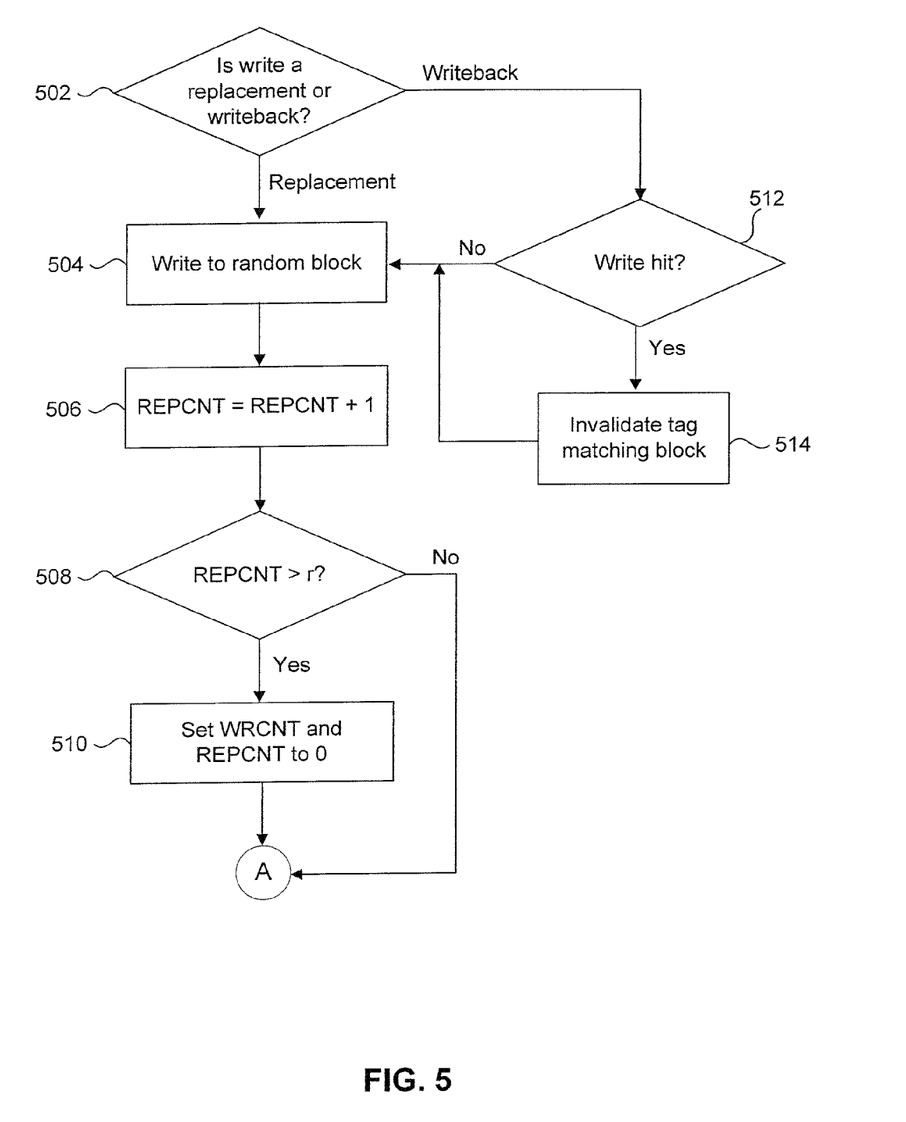
FIG. 5 depicts a flowchart describing random block selection, according to an embodiment.

FIG. 5 depicts a flowchart 500 describing in detail the random block selection, according to an embodiment. As can be appreciated, method 500 may not occur in the order shown or include all the operations shown.

The non-volatile cache replacement policy can perform different actions depending on the type of write being performed, as determined in step 502.

If the write is a replacement write, which can occur when a cache miss triggers a data read from main memory, the random replacement policy can proceed to step 504 and select a random cache block to write the data. The REPCNT can then be incremented by one, as shown in step 508.

At step 508, if the REPCNT exceeds a threshold, the method can proceed to step 510 where the WRCNT and the REPCNT can be reset to 0. Otherwise, the method proceeds back to step 404 in FIG. 4, to wait for another write.

If at step 502 the write is determined to be a writeback request, which can occur when data needs to be written to memory, the method can proceed to step 512. At step 512, the method can determine if there is a write hit, that is, if the main memory block to be written is already present in the cache. The processor searches the tag index for the tag of the block to be written. If there is a write hit, the method continues to step 514 and invalidates the tag matching block. Invalidating the tag matching block can prevent excessively using the same cache block if a main memory block is maintained in the cache for multiple writes. The method can then proceed to steps 504-510, to select a random block for the write, as explained above.

Figure 6:
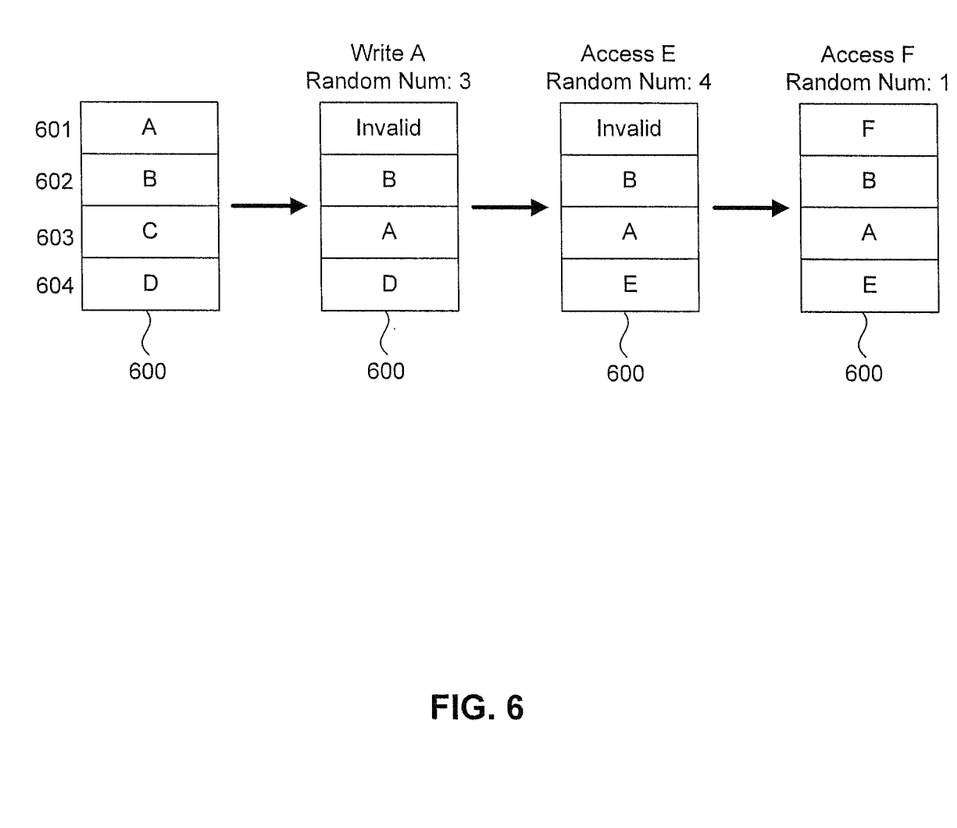
FIG. 6 depicts the operation of an exemplary non-volatile cache replacement policy on a cache set in the case of a writeback request, according to an embodiment.

FIG. 6 depicts the operation of an exemplary non-volatile cache replacement policy on a cache set 600 in the case of a writeback request, according to an embodiment. FIG. 6 depicts the exemplary contents of cache set 600 after subsequent writebacks using a non-volatile cache replacement policy. Cache set 600 contains cache blocks 601, 602, 603 and 604.

In an embodiment, the non-volatile cache replacement policy may operate in the following manner. Cache set 600 can initially store data A, B, C, D in blocks 601, 602, 603 and 604, respectively. Cache set 600 can receive a writeback request to write data A. Since data A is already present in the cache set (at block 601), a check of the cache would result in a write hit. However, instead of placing the new data A in the same cache block 601, the random cache replacement policy can invalidate block 601 and select a random block to store the new data A. In this example, the random replacement policy can randomly select block 603, and replace data C with data A. If data C was dirty, that is, not yet updated in main memory, data C can be written back to the main memory.

The cache set can then receive a request to write data E. In this case, the write does not result in a write hit because data E is not present in the cache set. The non-volatile cache replacement policy can then select a random block and place data E in that block. In this example, data E is randomly placed in block 604. Finally, the cache set can receive a request to write data F, and the random replacement policy randomly can select block 601 to store data F.

Intra-Block Write Variation—Block Offset Shift

In an embodiment, a block offset shift (BOS) scheme can be used to reduce write variation within a cache block. For example, in a cache block of 64 bytes, some data cells may be written more frequently than others. By shifting the mapping of the block offsets, the BOS scheme can reduce the intra-block write variation.

In an embodiment, the BOS scheme can divide data in a cache block into n groups. Parameter n can determine the granularity of the shifting data. For example, for cache blocks of 64 bytes and n=4, the cache block would be divided into four groups of 16 bytes each. A large value of n can reduce write variation at a finer granularity but can introduce a larger overhead. Selection of parameter n can involve a tradeoff between memory lifetime and space overhead. In an embodiment, parameter n can be an adjustable parameter selectable by a user or designer.

In an embodiment, the BOS scheme can periodically shift the mapping of a logical block offset (LBO) to a physical block offset (PBO). A LBO can describe a memory location for a processor accessing a memory. A PBO can describe a corresponding physical memory location in that memory. With reference to FIG. 1B, a block offset shift value (BOSV) 138 can be maintained for each block to indicate a shift to be applied to be PBO when writing to the particular block. In an embodiment, BOSV can be represented with log n bits.

Again with reference to FIG. 1B, each block can additionally maintain a bit flag (BF) 139, which can be used to indicate whether the particular block has been shifted during a cycle. This process is further explained below with reference to FIG. 7.

Figure 7:
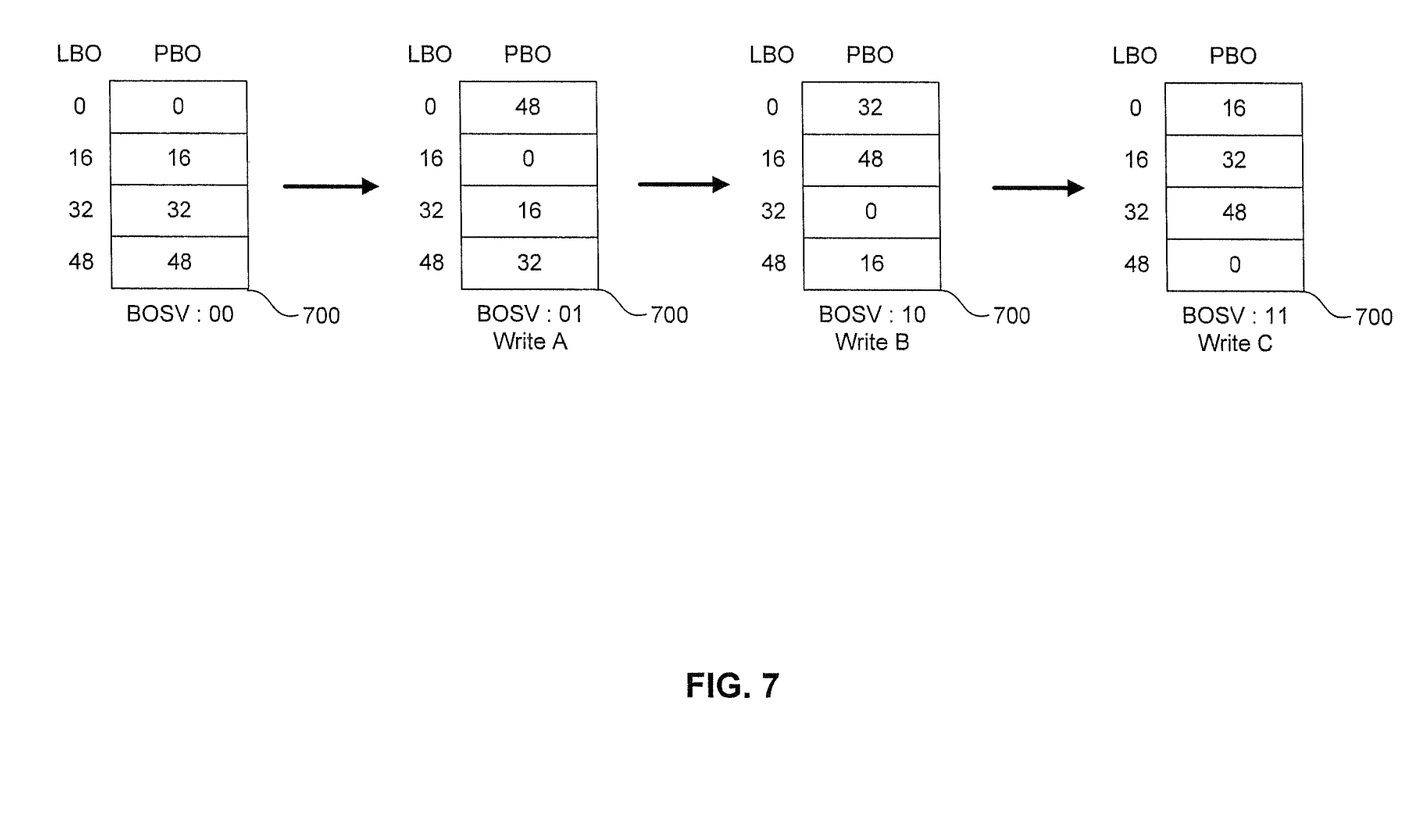
FIG. 7 depicts the operation of a block offset shift scheme on a cache block, according to an embodiment.

FIG. 7 depicts the operation of a block offset shift scheme on a cache block 700, according to an embodiment. In this example, n=4 and cache block 700 therefore has four groups 701, 702, 703 and 704, each consisting of 16 bytes. FIG. 7 depicts the effect of BOS on a cache block after several shifts. Block 700 is divided into four groups, each group containing the number of the first byte placed in that group.

Since there are four groups, BOSV can be two bits in this example. In an embodiment, cache block 700 can initially have a BOSV of 0, resulting in no shift between the (LBO) and (PBO). After a certain number of writes, BOSV can be incremented to 1 and, in this example, the PBO would be shifted by one group (16 bytes). The placement of the bytes in the block with BOSV=01 illustrates the shifting, in an embodiment. As illustrated, logical byte 0 can be written at the position of physical byte 16.

Again, after a certain number of writes, BOSV can be incremented by 1 with the resulting shift illustrated in the block labeled BOSV=10. The BOSV can be incremented to 11 and then would cycle back to 00.

A LBO-PBO mapping policy can describe how to generate the appropriate addresses for writing to cache or to main memory under a BOS scheme. In an embodiment, the mapping can be performed as follows:

---

G=cacheline_size/n (where n is the number of groups within a cacheline)
For mapping from LBO (main memory) to PBO (cache):
T = LBO − G*BOSV
If T < 0
    PBO = cacheline_size + G*BOSV − LBO
Else
    PBO = T
For mapping from PBO (cache) to LBO (main memory):
K = PBO + G*BOSV
If K > 63
    LBO = G*BOSV + PBO − cacheline_size
Else
    LBO = T

---

Figure 8:
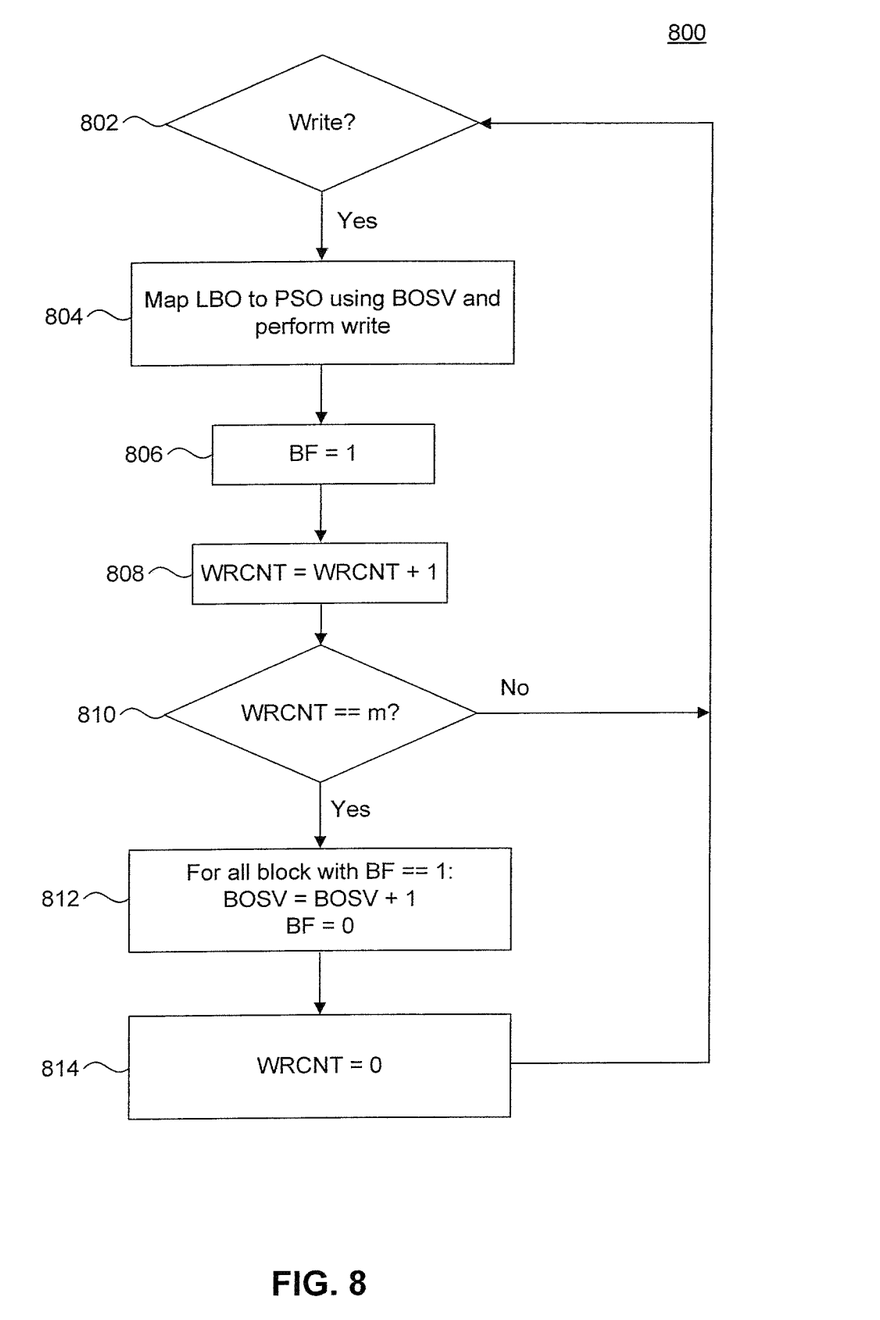
FIG. 8 depicts a flowchart illustrating the operation of a block offset shift scheme, according to an embodiment.

FIG. 8 depicts a flowchart 800 illustrating the operation of a BOS scheme, in an embodiment. As can be appreciated, method 800 may not occur in the order shown or include all the operations shown.

At step 802, the method can determine if a write is received. When a write is received, the method can proceed to step 804 and the write can be performed by mapping the LBO to the PBO according to the BOSV value. At step 808 the WRCNT for the cache set can be incremented by one. At step 806, the BF can be set to 1, indicating that a write has been performed since the last shift.

At step 810 the method can check whether the WRCNT has reached a threshold m. If WRCNT has reached the threshold, the process can continue to step 812. If WRCNT is less than the threshold, the method can move back to step 802 to wait for another write.

At step 812, for every block where BF equals 1, the BOSV of those blocks can be incremented by one and the BF reset to 0. The method can then proceed to step 814, where the WRCNT can be reset to 0.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Figure 9:
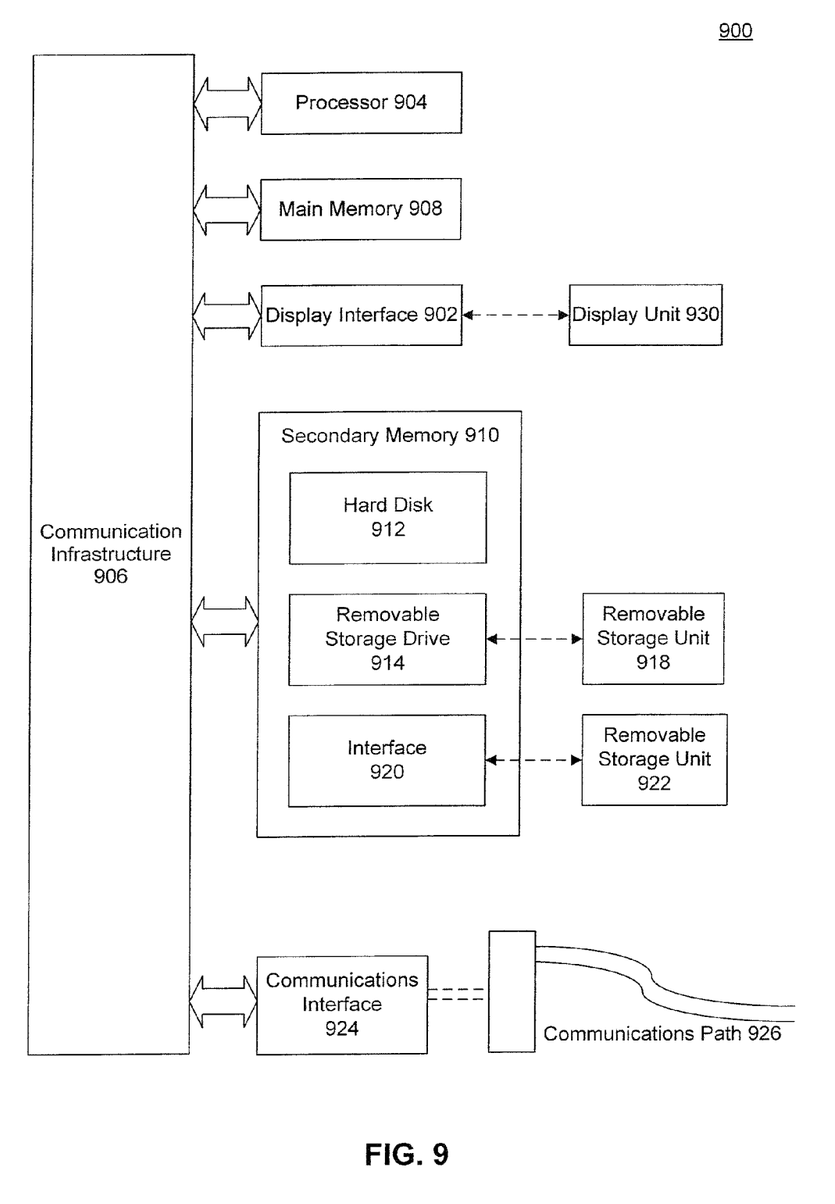
FIG. 9 depicts an illustration of an example computer system 900 in which embodiments, or portions thereof, can be implemented as computer-readable code.

Various aspects of embodiments of the present embodiments may be implemented in software, firmware, hardware, or a combination thereof. FIG. 9 is an illustration of an example computer system 900 in which embodiments, or portions thereof, can be implemented as computer-readable code. For example, the methods illustrated in the present disclosure can be implemented in portions system 900. Various embodiments are described in terms of this example computer system 900. After reading this description, it will become apparent to a person skilled in the relevant art how to implement embodiments using other computer systems and/or computer architectures.

It should be noted that the simulation, synthesis and/or manufacture of various embodiments may be accomplished, in part, through the use of computer readable code, including general programming languages (such as C or C++), hardware description languages (HDL) such as, for example, Verilog HDL, VHDL, Altera HDL (AHDL), other available programming and/or schematic capture tools (such as circuit capture tools), or hardware-level instructions implementing higher-level machine code instructions (e.g., microcode). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (e.g., a CPU core) that is embodied in program code and can be transformed to hardware as part of the production of integrated circuits.

Computer system 900 includes one or more processors, such as processor 904. Processor 904 may be a special purpose or a general-purpose processor. Processor 904 is connected to a communication infrastructure 906 (e.g., a bus or network).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Various aspects of embodiments of the present embodiments may be implemented in software, firmware, hardware, or a combination thereof. FIG. 9 is an illustration of an example computer system 900 in which embodiments, or portions thereof, can be implemented as computer-readable code. For example, the methods illustrated in the present disclosure can be implemented in portions system 900. Various embodiments are described in terms of this example computer system 900. After reading this description, it will become apparent to a person skilled in the relevant art how to implement embodiments using other computer systems and/or computer architectures.

It should be noted that the simulation, synthesis and/or manufacture of various embodiments may be accomplished, in part, through the use of computer readable code, including general programming languages (such as C or C++), hardware description languages (HDL) such as, for example, Verilog HDL, VHDL, Altera HDL (AHDL), other available programming and/or schematic capture tools (such as circuit capture tools), or hardware-level instructions implementing higher-level machine code instructions (e.g., microcode). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (e.g., a CPU core) that is embodied in program code and can be transformed to hardware as part of the production of integrated circuits.

Computer system 900 includes one or more processors, such as processor 904. Processor 904 may be a special purpose or a general-purpose processor. For example, in an embodiment, processor 110 of FIG. 1 may serve the function of processor 904. Processor 904 is connected to a communication infrastructure 906 (e.g., a bus or network).

Computer system 900 also includes a main memory 908 (e.g., random access memory (RAM)), and may also include a secondary memory 910. Secondary memory 910 can include, for example, a hard disk drive 912, a removable storage drive 914, and/or a memory stick. Removable storage drive 914 can include a floppy disk drive, a magnetic tape drive, an optical disk drive, a flash memory, or the like. The removable storage drive 914 reads from and/or writes to a removable storage unit 918 in a well-known manner. Removable storage unit 918 can comprise a floppy disk, magnetic tape, optical disk, etc. which is read by and written to by removable storage drive 914. As will be appreciated by persons skilled in the relevant art, removable storage unit 918 includes a computer-usable storage medium having stored therein computer software and/or data.

In alternative implementations, secondary memory 910 can include other similar devices for allowing computer programs or other instructions to be loaded into computer system 900. Such devices can include, for example, a removable storage unit 922 and an interface 920. Examples of such devices can include a program cartridge and cartridge interface (such as those found in video game devices), a removable memory chip (e.g., EPROM or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices. Communications interface 924 can include a modem, a network interface (such as an Ethernet card), a communications port, a PCMCIA slot and card, or the like. Software and data transferred via communications interface 924 are in the form of signals which may be electronic, electromagnetic, optical, or other signals capable of being received by communications interface 924. These signals are provided to communications interface 924 via a communications path 926. Communications path 926 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 918, removable storage unit 922, and a hard disk installed in hard disk drive 912. Computer program medium and computer-usable medium can also refer to memories, such as main memory 908 and secondary memory 910, which can be memory semiconductors (e.g., DRAMs, etc.). These computer program products provide software to computer system 900.

Computer programs (also called computer control logic) are stored in main memory 908, secondary memory 910 and/or removable storage units 918 and 922. Computer programs may also be received via communications interface 924. Such computer programs, when executed, enable computer system 900 to implement embodiments as discussed herein. In particular, the computer programs, when executed, enable processor 904 to implement processes of embodiments, such as the steps in the methods illustrated by the flowcharts of the figures discussed above. Accordingly, such computer programs represent controllers of the computer system 900. Where embodiments are implemented using software, the software can be stored in a computer program product and loaded into computer system 900 using removable storage drive 914, interface 920, hard drive 912, or communications interface 924.

Embodiments are also directed to computer program products including software stored on any computer-usable medium. Such software, when executed in one or more data processing device, causes a data processing device(s) to operate as described herein. Embodiments employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

What is claimed is:

1. A computer-implemented method for writing to a memory, the method comprising:
   maintaining a write count value associated with a set of memory locations in a cache memory, wherein the write count value is incremented for each write to the set of memory locations;
   selecting a block offset shift scheme as the cache replacement policy based on the write count value; and
   mapping a logical block within the set for writing data to a physical block using the block offset shift scheme.

2. The method of claim 1, wherein the block offset shift scheme selects a random block.

3. The method of claim 1, wherein the selecting the block offset shift scheme further comprises selecting a first block offset shift scheme in response to the write count value being less than a threshold and selecting a second block offset shift scheme in response to the write count value reaching the threshold.

4. The method of claim 3, wherein the second block offset shift scheme is a random selection policy.

5. The method of claim 1, further comprising writing data to the selected block.

6. The method of claim 1, further comprising:
   determining a tag associated with a first data to be written matches a second data in the cache memory;
   invalidating the block containing the second data; and
   writing the first data to a random block.

7. A system comprising:
   a processor; and
   a memory configured to store information that causes the processor to perform operations comprising:
   maintaining a write count value associated with a set of memory locations in a cache memory, wherein the write count value is incremented for each write to the set of memory locations;
   selecting a block offset shift scheme as a cache replacement policy based on the write count value; and
   mapping a logical block within the set for writing data to a physical block using the block offset shift scheme.

8. The system of claim 7, wherein the block offset shift scheme selects a random block.

9. The system of claim 7, further comprising selecting a first block offset shift scheme when the write count value is less than a threshold and selecting a second block offset shift scheme when the write count value reaches the threshold.

10. The system of claim 9, wherein the second block offset shift scheme is a random selection policy.

11. The system of claim 7, further comprising writing data to the block.

12. The system of claim 7, further comprising:
    determining a tag associated with a first data to be written matches a second data in the cache memory;
    invalidating the block containing the second data; and
    writing the first data to a random block.

13. A non-transitory computer-readable storage medium having instructions stored thereon, execution of which by a processor cause the processor to perform operations, the operations comprising:
    maintaining a write count value associated with a set of memory locations in a cache memory, wherein the write count value is incremented for each write to the set of memory locations;
    selecting a block offset shift scheme as a cache replacement policy based on the write count value; and
    mapping a logical block within the set for writing data to a physical block using the block offset shift scheme.

14. The non-transitory computer-readable storage medium of claim 13, wherein the block offset shift scheme selects a random block.

15. The non-transitory computer-readable storage medium of claim 13, wherein the selecting a block offset shift scheme further comprises selecting a first block offset shift scheme when the write count value is less than a threshold and selecting a second block offset shift scheme when the write count value reaches the threshold.

16. The non-transitory computer-readable storage medium of claim 15, wherein the second block offset shift scheme is a random selection policy.

17. The non-transitory computer-readable storage medium of claim 13, further comprising writing data to the block.

18. The non-transitory computer-readable storage medium of claim 13, further comprising:
    determining a tag associated with a first data to be written matches a second data in the cache memory;
    invalidating the block containing the second data; and
    writing the first data to a random block.

* * * * *